United States Patent [19]  [11] 4,417,031
Aharoni et al.  [45] Nov. 22, 1983

[54] PROCESS FOR PREPARING GRAFT AND BLOCK COPOLYMERS

[75] Inventors: Shaul M. Aharoni, Morris Plains; Theodore Largman, Morristown, both of N.J.

[73] Assignee: Allied Corporation, Morris Township, Morris County, N.J.

[21] Appl. No.: 337,800

[22] Filed: Jan. 7, 1982

[51] Int. Cl.³ .................. C08G 81/00; C08G 81/02
[52] U.S. Cl. .................. 525/425; 525/183; 525/432
[58] Field of Search .................. 525/425, 432, 183

[56] References Cited

U.S. PATENT DOCUMENTS

| Re. 30,322 | 7/1980 | Hammer | 525/183 |
|---|---|---|---|
| 3,274,289 | 9/1966 | Murdock | 525/183 |
| 3,378,602 | 4/1968 | Robertson | 525/425 |
| 3,468,975 | 9/1969 | Duxbury | 525/425 |
| 3,493,597 | 1/1950 | Rothrock et al. | 524/606 |
| 3,493,632 | 2/1970 | Okazaki | 525/425 |
| 3,551,548 | 12/1970 | Brignac et al. | 264/234 |
| 3,632,666 | 1/1972 | Okazaki | 525/425 |
| 3,683,047 | 8/1972 | Honda | 525/432 |
| 3,839,245 | 10/1974 | Schlossman | 525/425 |
| 3,845,163 | 10/1974 | Murch | 525/183 |
| 3,972,961 | 8/1976 | Hammer | 525/183 |
| 4,246,371 | 1/1981 | Meyer | 525/183 |
| 4,252,920 | 2/1981 | Deleens | 525/425 |
| 4,297,454 | 10/1981 | Thompson | 525/432 |

FOREIGN PATENT DOCUMENTS 1150725 4/1969 United Kingdom .............. 525/432

Primary Examiner—Wilbert J. Briggs, Sr.
Attorney, Agent, or Firm—Kenneth E. Stroup, Jr.; Jay P. Friedenson; Richard C. Stewart, II

[57] ABSTRACT

A process for preparing block, and/or graft copolymeric compositions by forming an intimate mixture of two or more polymers, at least one of which includes one or more amino junctions and at least one of the remaining polymers includes one or more carboxylic acid junctions and an effective amount of a phosphite compound, and thereafter heating the intimate mixture at a temperature and for a time sufficient to form the desired block, and/or graft copolymers.

14 Claims, No Drawings

PROCESS FOR PREPARING GRAFT AND BLOCK COPOLYMERS

BACKGROUND OF THE INVENTION

1. Field of the Invention

This invention relates to a process for preparing graft and/or block copolymers, more particularly, this invention relates to a process for preparing block and/or graft polymers composed of combinations of polymers at least one of which includes one or more carboxylic acid groups and at least one of the other polymers includes one or more amino groups. Block and/or graft copolymers prepared in accordance with the process of this invention are capable of being fabricated into useful shaped articles of manufacture, e.g., filaments, both mono- and multifilament, films, tapes, ribbons, rods, laminates, etc.

2. Description of the Prior Art

Polymer compositions are disclosed in the prior art as having many and varied uses in industrial and commercial applications. For example, these polymers can be formed into filaments in which the polymer chains are oriented along the filament axis. Such filaments have many uses, in commercial application, as for example, in the production of fibers for tire cord, textiles and the like. Similarly, these polymers can be fabricated into other useful shaped articles, as for example, films, gears, lawn mower housing, skate boards and the like, through use of conventional molding and fabrication techniques.

The utility of a particular polymer for a particular application is very much dependent on the physical properties of the polymer. For example, polymers having increased molecular weights form fibers and molded articles having superior properties. Fibers and molded articles made from such polymers have increased tensile strength, durability and impact resistance. Accordingly, processes for increasing the molecular weight of various polymers are valuable procedures in tailoring such polymers for optimazation of such properties.

Similarly, various functional groups and polymer side chains, as well as the structural comformation of certain polymers, are factors which affect the physical characteristics of polymers and thus are also critical to the utility of these polymers. Thus, procedures for varying and controlling these function groups, side chains and structural conformations are also valuable tools in tailoring polymers for specific uses and as such are valuable tools to those of skill in the polymer art.

SUMMARY OF THE INVENTION

In accordance with this invention, there is provided a process for forming graft and/or block copolymers which comprises the steps of:

A. forming an intimate mixture of two or more polymers, at least one of said polymers includes at least one amino group and at least one of the remaining polymers includes at least one carboxylic acid group; and an effective amount of one or more phosphite compounds of the formula;

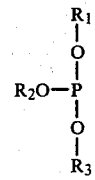

and/or symmetrical and assymetrical diphosphite derivatives thereof, wherein;

$R_1$ is alkyl, haloalkyl, phenyl or phenyl substituted with one or more substituents selected from the group consisting of alkyl, haloalkyl, cyano, nitro, alkylcarbonyl, isocyanato, $R_2$ and $R_3$ are the same or different and are individually hydrogen, a metal cation, ammonium radical or $R_1$; and B. Heating said mixture for a time and at a temperature sufficent to form said block, and/or graft copolymer.

As used herein, "an effective amount" is an amount of one ore more phosphite compounds which is effective to cause the formation of the desired block, and/or graft copolymers. The formation of the block, and/or graft copolymer will be accompanied by a decrease in the melt index of the mixture of polymers and an increase in the viscosity of the mixture.

As used herein "melt index" denotes a particular combination of test conditions for measuring the rate of extrusion of the polymer mixture through an orifice of specified length and diameter. The equipment is called a melt indexer because it permits the indexing or classification of melted resins according to an agreed upon convention. The melt indexer has been adopted and standardized as an ASTM Tentative Method of Measuring Flow Rates of Thermoplastics by Extrusion Plastometer (D 1238), ISO Recommendation and the Determination of the Index of Fluidity of Polyethylene Compounds (R317), British Standards BS 1972 and BS 2782 Method 105C, and Government Department Electrical Specification No. 27, 1950, Great Britain. Manufacturers of melt index equipment meeting the ASTM requirements are: Appalachian Electronids Inc., Ronceverte, W. Va.; F. F. Slocomb Corporation, Wilmington, Del.; Tinius Olson Testing Machine Company, Willow Grove, Pa.; and W. J. Hacker and Company, Inc., West Caldwell, N.J.

And used herein, "viscosity" denotes the internal friction, i.e. fluidity of the polymer mixture, and is well known in the art. A wide variety of viscometers are available for measurement of viscosity, such as capillary, rotational, orifice, falling ball, and oscillatory types. They are described in Barr, "A Monograph of Viscometry", Oxford, New York (1931) and Kirk and Othmer, "Encyclopedia of Chemical Technology", Vol. 14, pp. 756–775 the Interscience Encyclopedia, Inc., New York (1955).

DETAILED DESCRIPTION OF THE INVENTION

The process of this invention is conveniently carried out in two steps. The first step of the process consists of forming an intimate mixture of two or more appropriate polymers as describd above and one or more phosphite compounds of the formula:

wherein $R_1$, $R_2$, and $R_3$, are as described hereinabove. In the second step of the process, the intimate mixture is heated at a temperature and for a time sufficient to form the desired block, and/or graft copolymers. The formation of such copolymer is indicated by a decrease in the melt index and an increase in the viscosity of the polymer mixture.

In a preferred embodiment of this invention, a molten mixture is formed in the first process step. As used herein, "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. In a particularly preferred embodiments of this invention, the polymers are heated above the melting point of each of the polymers in the mixture. An effective amount of one or more phosphite compounds in a liquid or powdered form is added to the melted polymers while at the same time vigorously stirring the melt, or added prior to melting and mixing. Heating is continued until the desired block, and/or graft copolymers are formed as indicated by a decrease in the melt index and an increase in the viscosity.

In the most preferred embodiment, the components of the intimate mixture can be granulated, and the granulated components mixed dry in a suitable mixer, as for example a tumbler or a Branbury Mixer, or the like, as uniformly as possible. Thereafter, the composition is heated in an extruder until the polymer components are melted. As described above, the mixture is heated until the desired block, and/or graft copolymers are formed as indicated by a decrease in the melt index and an increase in the viscosity, and is thereafter ejected with cooling.

The order of mixing of the various components of the intimate mixture is not critical. Accordingly, the order of addition of the polymers and phosphite compounds and other optional components to be described in more detail hereinbelow, to form the intimate mixture can be varied as desired.

The process of this invention is preferably carried out in the absence of air, as for example in the presence of an inert gas, such as, argon, carbon dioxide, nitrogen or the like. The process can be carried out in a batchwise or discontinuous fashion, as for example, carrying out the process in a sealed container. Alternatively, the process can be carried out in a continuous fashion in a single processing zone, as for example by use of an extruder as described hereinabove, or in a plurality of such reaction zones, in series or parallel.

Reaction temperature can be varied over a wide range. However, it should be appreciated that the process temperature employed in any specific instance will depend on the particular polymer or polymers employed and, in the preferred embodiments should be at least as high as the melting point of the polymers and below the degradation temperature of the polymers. In the preferred embodiments of this invention, the process temperature is such that the polymer will remain in the molten state as the block, and/or graft copolymers are formed. Normally this can be accomplished in one of two ways. Either the process can be carried out at a temperature which is equal to or greater than the melting point of the desired product; or process temperatures can be increased periodically over the course of the conduct of the process so as to maintain the mixture in the molten state. In the particularly preferred embodiments of this invention employing particularly preferred polymer compositions, the process temperature is at least about 150° C. Amongst these particularly preferred embodiments, most preferred process temperatures are in the range of from about 200° C. to about 300° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogeneous pressure.

The process is carried out for a time sufficient to form the desired block, and/or graft copolymers as is indicated by the decrease in the melt index and increase in the viscosity of the mixture. Reaction times can be varied over a wide range. Usually reaction times will depend on a variety of factors such as the polymeric components, reaction temperatures, phosphite component and its concentration, and other factors known to those of skill in the art to affect reaction times. In most instances, the reaction time can vary from a few seconds to 24 hours or more. In the preferred embodiments of this invention reaction times will vary from about 1 min. to about 2 hours and in the particularly preferred embodiments from about 2 min. to about 30 to 60 mins.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

Phosphite compounds useful in the conduct of the process of this invention are those of the formula:

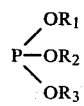

wherein $R_1$, $R_2$ and $R_3$ are as described herein above. Illustrative of such compounds are aliphatic and haloaliphatic phosphite compounds such as those wherein $R_1$, $R_2$ and/or $R_3$ are the same or different and are t-butyl, n-butyl, isopropyl, trifluoromethyl, hexyl, 2-chloroethyl, 3-chlorobutyl, pentyl, ethyl, neopentyl, and the like. Aryl phosphite compounds are also useful in the conduct of the process of this invention. Illustrative of such useful aryl phosphite compounds are those in which $R_1$, $R_2$ and/or $R_3$ are the same or different and are phenyl, or phenyl substituted with one or more alkyl groups as for example 3,5-di-tert-butyl phenyl, 4-tert butyl phenyl, 3-isopropyl phenyl, 2,4-dimethyl phenyl and the like; one or more halo groups as for example 4-chlorophenyl, 2,4-dibromophenyl, 4-fluorophenyl, 3,5-dichlorophenyl and the like; cyano, such as 4-cyanophenyl; nitro, as for example, 2-nitro phenyl; alkylcarbonyl, as for example 2-methylcarbonyl phenyl; aldehyde functions and the like. Sodium, potassium, zinc, lithium, calcium, barium, magnesium, aluminum, lanthanium and other metal salts, and/or ammonium salts of phosphite compounds in which $R_2$ and/or $R_3$ are cations are also useful. Symmetrical and assymetrical diphosphite derivatives of the above referenced phosphite compounds can also be useful. Phosphite compounds for use in the particularly preferred embodiments of this invention are those in which $R_1$, $R_2$ and $R_3$ are the same, and amongst these particularly preferred embodiments those in which $R_1$, $R_2$ and $R_3$ are n-butyl, phenyl and 3,5-di-tert butylphenyl are most preferred.

An effective amount of one or more phosphite compounds is employed in forming the intimate mixture. As used herein, "an effective amount" is an amount of the phosphite compounds which when added to the polymeric component in accordance with this invention forms a mixture which when heated forms the desired block, and/or graft copolymers. In the preferred embodiments of this invention, the quantity of the one or more phosphite compounds employed is at least about 0.05 weight percent, based on the total weight of the mixture. In the particularly preferred embodiments of this invention, the weight percent of phosphite compounds is in the range of from 0.1 to about 10 weight percent, and amongst these particularly preferred embodiments, those in which the quantity of phosphite compound employed is from about 0.2 to about 2 weight percent based on the total weight of the mixture are most preferred.

Polymers which are useful in the conduct of the process of this invention are those which include one or more amino and/or carboxylic acid functions. The critical requirement in the selection of a particular group of polymers for use in the process is that at least one of the polymers contain one or more amino functions, and that at least one of the remaining polymers contains one or more carboxylic acid functions.

Illustrative of polymers which may be utilized in the process of this invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

—NHCORCONHR$^1$— in with R is an alkylene group of at least two carbon atoms, preferably from 2 to 10; and $R^1$ is selected from R and phenyl groups. Also, included are copolyamides and terpolyamides obtained by known methods, as for example, by condensation of hexamethylene diamine and a mixture of dibasic acids consisting of terephthalic acid and adipic acid. In addition to the above polyamides, also useful are polyamides obtained from amino acids and derivatives thereof as for example lactams.

Polyamides of the above description are well-known in the art and include, for example, the copolyamide of 30% hexamethylene diammonium isophthalate and 70% hexamethylene diammonium adipate, the copolyamide of up to 30% bis-(p-amidocyclohexyl) methylene, terephthalic acid and caprolactam, polyhexamethylene adipamide (nylon 66), poly(butyrolactam) (nylon 4), poly(enantholactam) (nylon 7), poly(capryllactam) (nylon 8), polycaprolactam (nylon 6), polyhexamethylene sebacamide (nylon 610), polyaminoundecanamide (nylon 11), polydodecanolactam (nylon 12) polyhexamethylene isophthalamide, polyhexamethylene terephthalamide, polycaproamide, or combinations thereof. The polyamide for use in the most preferred embodiments of this invention is polycaprolactam which is commercially available from Allied Corporation under the tradename Capron ™ Nylon.

Long chain hydrocarbon acids including 1, 2 or 3 carboxylic acid functions and up to about twenty-five carbon atoms and more can be grafted onto polymers having one or more amino functions in the process of this invention. Illustrative of such useful hydrocarbon acids are those having from about 9 to about 25 carbon atoms, which include such aliphatic mono-carboxylic acids as, for example, capric acid, lauric acid, myristic acid, palmitic acid, stearic acid, oleic acid, linoleic acid, behenic acid, pelargonic acid, and the like; aliphatic dicarboxylic acids such as sebacic acid, azelaic acid, and the like; aliphatic tricarboxylic acids such as citric acid, and the like; and the trimerized and dimerized derivatives of the above-mentioned fatty acids.

Other useful polymers include organic acid homopolymers and copolymers having pendant carboxylic functions. Illustrative of useful homopolymers and copolymers are those which are derived from the addition polymerization of $\alpha,\beta$-unsaturated carboxylic acids having 1 or 2 carboxyl groups and the addition copolymerization of such acids and other $\alpha,\beta$-unsaturated chemical species, as for example olefins, having the general formula $RCH=CH_2$, wherein R is phenyl, halogen, cyano, hydrogen, alkyl having from 1 to about 6 carbon atoms, alkoxycarbonyl having from 1 to about 6 carbon atoms, haloalkyl having from about 1 to 6 carbon atoms, amido, and the like. Illustrative of such useful polymers are acrylamide/acrylic acid copolymer, poly(acrylic acid) polymer, poly(methacrylic acid) polymer, styrene/maleic acid copolymers; methacrylic acid/ethylene copolymer; acrylic acid/ethylene copolymer; acrylic acid/tetrafluoro ethylene copolymer; and homopolymers and copolymers of crotonic acid, isocrotonic acid, sorbic acid, cinnamic acid, fumaric acid and the like. Preferred organic acid polymers for use in this invention are copolymers of ethylene and acrylic acid, and copolymers of ethylene and methacrylic acid. Amongst the preferred copolymers particularly preferred are those in which the olefin content is at least about 75 mol percent based on the total moles of monomeric recurring units in the polymer.

Other polymers which may be employed in the process of this invention are linear polyesters. The type of polyester is not critical and the particular polyester chosen for use in any particular situation will depend essentially on the physical properties and features, i.e. flexibility, hardness, toughness, desired in the final shaped article of manufacture. Thus, a multiplicity of linear thermoplastic polyesters having wide variations in physical properties are suitable for use in the process of this invention.

The particular polyester chosen for use can be a homo-polyester or a co-polyester, or mixtures thereof as desired. Polyesters are normally prepared by the condensation of an organic dicarboxylic acid and an organic diol, and, therefore, illustrative examples of useful polyesters will be described hereinbelow in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to about 12 carbon atoms. Such aromatic diols include bis-(p-hydroxyphenyl) ether; bis-(p-hydroxyphenyl) thioether; (bis-(p-hydroxyphenyl)-sulphone; (bis-(p-hydroxyphenyl)-methane; 1,2-(bis-(p-hydroxyphenyl)-ethane; 1-phenyl-(bis-(p-hydroxyphenyl)-methane; diphenyl-(bis-(p-hydroxyphenyl)-methane; 2,2-bis(4'-hydroxy-3'-dimethylphenyl)propane; 1,1- or 2,2-(bis(p-hydroxyphenyl)-butane; 1,1-dichloro-or 1,1,1-trichloro-2,2-(bis-(p-hydroxyphenyl)-ethane; 1,1-(bis-(p-hydroxyphenyl)-cyclopentane; 2,2-(bis-(p-hydroxyphenyl)-propane (bisphenol A); 1,1-(bis-(p-hydroxyphenyl)-cyclohexane (bisphenol C); p-xylene glycol; 2,5-dichloro-p-xylylene glycol; p-xylenediol; and the like.

Suitable cycloaliphatic diols include those having from about 5 to about 8 carbon atoms. Exemplary of such useful cycloaliphatic diols are 1,4-dihydroxy cyclohexane; 1,4-dihydroxy methylcyclohexane; 1,3-dihydroxycyclopentane; 1,5-dihydroxycycloheptane; 1,5-dihydroxycyclooctane; 1,4-cyclo-hexane dimethanol; and the like. Polyesters which are derived from aliphatic diols are preferred for use in this invention. Useful and preferred aliphatic diols include those having from about 2 to about 12 carbon atoms, with those having from about 2 to about 6 carbon atom being particularly preferred. Illustrative of such preferred diol precursors are 1,2- or 1,3-propylene glycol; ethylene glycol, neopentyl glycol, pentyl glycol, 1,6-hexanediol, 1,4-butanediol and geometrical isomers thereof. Propylene glycol, ethylene glycol and 1,4-butanediol are particularly preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cycloaliphatic dicarboxylic acids. Illustrative of aliphatic dicarboxylic acids which can be used in this invention are those having from about 2 to about 50 carbon atoms, as for example, oxalic acid, malonic acid, dimethylmalonic acid, succinic acid, octadecylsuccinic acid, pimelic acid, adipic acid, trimethyladipic acid, sebacic acid, suberic acid, azelaic acid and dimeric acids (dimerisation products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4'-dicyclohexyldicarboxylic acid, and the like.

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-, 1,4-, 2,6 or 2,7-naphthalenedicarboxylic acid, 4,4'-diphenyldicarboxylic acid, 4,4'-diphenylsulphone-dicarboxylic acid, 1,1,3-trimethyl-5-carboxy-3-(p-carboxy-phenyl)-indane, diphenyl ether 4,4'-dicarboxylic acid bis-p(carboxyphenyl)methane and the like. Of the aforementioned aromatic dicarboxylic acids based on a benzene ring such as terephthalic acid, isophthalic acid orthophthalic acid are preferred for use and amongst these preferred acid precursors, terephthalic acid is particularly preferred.

In the most preferred embodiments of this invention, poly(ethylene terephthalate), poly(butylene terephthalate), and poly(1,4-cyclohexane dimethylene terephthalate), are the polyesters of choice. Among these polyesters of choice, poly(ethylene terephthalate) is most preferred.

Various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired block and/or graft copolymers have been formed. Such optional components include fillers, plasticizers, impact modifiers, colorants, mold release agents, antioxidants, ultraviolet light stabilizers, lubricants, antistatic agents, fire retardants, and the like. These optional components are well known to those of skill in the art, accordingly, only the preferred optional components will be described herein in detail.

The block, and/or graft copolymers prepared in the process of this invention preferably includes a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents are adhesion promoters as is known to those skilled in the art. Useful fillers may be selected from a wide variety of minerals, metals, metal oxides, siliceous materials, metal salts, and mixtures thereof. Examples of such useful fillers include glass fibers alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like such fillers are well known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer and phosphite components, and in the particularly preferred embodiment is in the range of from about 0.30 to about 90 weight percent on the same basis.

It is also very desirable to include aa plasticizer of the type known in the art for use with polymer composition. Useful plasticizers will depend on various factors including the type of polymers employed, and include caprolactam, mixtures of ortho and para toluene ethyl sulfonamides, and the like.

The process of this invention provides graft, and/or block polymer compositions having decreased melt indexes and increased viscosities. Such polymers are extremely useful as tire cord in pneumatic tires, and the products, filaments, fibers and yarn produced therewith have significantly better properties than other polymers. For example, the fibers have increased tenacity, greater breaking strength and greater resistance to depolymerization. When yarn produced from a block, and/or graft copolymer prepared by the process of this invention is made into tire cord and the cord is then used for pneumatic tire reinforcement, the life span of the tire is markedly increased over that of tires reinforced with cord made from other polymers. They are thermoplastic materials from which molded articles of manufacture having valuable properties can be produced by the conventional shaping processes, such as casting, injection molding and extruding. Examples of such moldings are components for technical equipment, apparatus castings, household equipment, sports equipment, components for the electrical and electronics industries and electrical insulations, car components, circuits, fibers and semifinished products which can be shaped by machining. The use of the materials for coating articles by means of immersion or powder coating processes is also possible as is their use as hot-melt adhesives. The polymer compositions according to the invention are outstandingly suitable for specific applications of all types since their spectrum of properties can be modified in the desired direction in manifold ways.

Compositions prepared accordance with the process of this invention are outstandingly suitable for the production of sheets and panels having valuable properties. The sheets and panels prepared from such compositions are suitable as coating materials for other materials comprising, for example, wood, glass, ceramic, metal or other plastics, and outstanding strengths can be achieved using conventional adhesion promoters, as for example, promoters based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, as for example by lacquering or by the application of protective films. The compositions prepared in accordance with the process of this invention can be made into films with or without fillers, which may be transparent or translucent.

The following specific examples are presented to more particularly illustrate the invention, and should not be construed as being limitations on the scope and spirit of the invention.

EXAMPLES I TO IV

In these examples, various representative embodiments of this invention were carried out employing the following general mixing and extrusion procedures.

A. Mixing

The polymers were in the form of ⅛" pellets. After weighing in wide-mouth jars, the polymer samples were dried for 16 hours at 100°–110° C. in a vacuum oven. This drying step was done prior to blending, and the samples were kept in sealed jars during interim periods to maintain dryness. Weighed amounts of the phosphite additives were added to the polymers and the sealed jars were rotated on a rolling mill for 0.5 hr. This rotation action effectively coated the surface of the pellets with the phosphite additives.

B. Extrusion

Melt blending was accomplished using a Wayne extruder with a mixing screw 1" diameter and 25" long operated at an extrusion temperature greater than the melting points of both polymers. Extrusion rates were controlled by a variable speed motor. The single strand extrudate proceeded from the die into a water bath whose level was maintained within inches of the die and whose water temperature was maintained at approximately 10° C. with ice. From the water bath the strand exited to a small Wayne pelletizer. Alternatively, the extrudate can be cooled in a stream of air at room temperature.

Pellets were vacuum dried and subjected to a relative viscosity determination for evaluation of block and/or graft polymer formation. Reduced viscosity was at 23° C., 0.5% concentration of polymer in m-cresol. The percent composition of the resulting polymer compositions, based on the total weight, and their physical properties, i.e. viscosity [η] are set forth in the following TABLE I:

TABLE I

| Ex. | Weight and type of Polymer in the Mixture | Weight % Phosphite Additive | [η] |
|---|---|---|---|
| I | 500g N-6[1]/50g S[2] | 2.5g TPP | — |
| II | 500g N-6/50g S | 5.5g TPP | — |
| III | 500g N-6/50g EAA[3] | 2.75g TPP | — |
| IV | 500g N-6/50g EAA | 5.5g TPP | — |
| V | 250g N-6/25g PET[4] | 2.5g TPP | — |
| VI | 250g N-6/250g PET | 5.0g TPP | — |
| VII | 95g N-6/5g PET | 0 TBP | 1.91 |
| VIII | 95g N-6/5g PET | .6 TBP | 2.66–3.86 |
| IX | 90g N-6/10g PET | 0 TBP | 1.84 |
| X | 90g N-6/10g PET | .6 TBP | 2.26–3.26 |
| XI | 80g N-6/20g PET | 0.0 TBP | 1.68 |
| XII | 80g N-6/20g PET | 0.6 TBP | 2.66 |
| XIII | 100g PET | 0.6 TBP | 0.48 |
| XIV | 90g N-6/10g PET | 0.6 TBP | 2.56–3.15 |
| XV | 19g N-6/1g N-12[5] | — | 1.45 |
| XVI | 19g N-6/1g N-12 | 0.6 TBP | 2.82–3.87 |
| XVII | 9g N-6/1g N-12 | — | 1.92 |
| XVIII | 9g N-6/1g N-12 | 0.6 TBP | 3.73–3.93 |
| XIX | 19g N-6/1g N-11[6] | 0 | 2.41–2.59 |
| XX | 19g N-6/1g N-11 | 0.6 TBP[7] | 2.88–3.12 |
| XXI | 9g N-6/1g N-11 | 0 | 2.48 |
| XXII | 9g N-6/1g N-11 | 0.6 TBP | 2.62 |
| XXIII | 1g N-6/1g N-11 | 0 | 1.48 |
| XXIV | 1g N-6/1g N-11 | 0.6 TBP | 2.08–2.50 |
| XXV | 9g N-6/1g N-11 | 0 | 3.71–4.08 |
| XXVI | 9g N-6/1g N-11 | 0.6 TBP | 2.60 |
| XXVII | 90g Ean[10]/10g N-6 | .3 TBP | 1.97–2.02 |
| XXVIII | 90g Ean/10g N-6 | .4 TBP | 2.02 |
| XXIX | 90g Ean/10g N-6 | .6 TBP | 2.12–2.19 |
| XXX | 90g Ean/10g N-6 | .6 TBP | 2.68 |
| XXXI | 90g Ean/10g N-11 | 0 | — |
| XXXII | 90g Ean/10g N-11 | .1 TBP | — |
| XXXIII | 90g Ean/10g N-11 | .3 TBP | — |
| XXXIV | 90g Ean/10g N-11 | .2 TBP | 2.68 |
| XXXV | 80g N-6/20g N-66[9] | — | 1.46 |
| XXXVI | 100g N-6 | .1 TPP | 1.68 |

TABLE I-continued

| Ex. | Weight and type of Polymer in the Mixture | Weight % Phosphite Additive | $[\eta]$ |
|---|---|---|---|
| XXXVII | 80g N-6/20g N-66 | .1 TPP | 2.60 |
| XXXVIII | 60g N-6/40g N-66 | — | 1.44 |
| XXXIX | 60g N-6/40g N-66 | .1 TPP | 2.80 |
| XL | 40g N-6/60g N-66 | .1 TPP | 3.15 |
| XLI | 20g N-6/80g N-66 | .1 TPP | 1.79 |
| XLII | 40g N-6/60g N-66 | — | 1.41 |
| XLIII | 100g N-66 | .1 TPP | 2.22 |
| XLIV | 100g N-6 | — | 1.60 |
| XLV | 100g N-66 | — | 1.36 |
| XLVI | 20g N-6/80g N-66 | — | 1.38 |
| XLVII | 250g N-6/250g PBT[11] | 1.0 TPP | >2.00 |

[1]"N-6" is polycaprolactam manufactured and marketed by Allied Corporation under the trademark Capron ®.
[2]"S" is a copolymer of ethylene and acrylic in which a portion of the pendant acid functions are neutralized, manufactured and marketed by DuPont under the trademark Surlyn.
[3]"EAA" is copolymer of ethylene and acrylic acid.
[4]"PET" is polyethylene terephthalate.
[5]"N-12" is polylaurylactam.
[6]"N-11" is poly- -amino undecanoic acid.
[7]"TBP" is tributyl phosphite.
[8]"TPP" is triphenyl phosphite.
[9]"N-66" is poly(hexamethylene adipamide).
[10]"EAN" is amine terminated N-6.
[11]"PBT" is polybutylene terephthalate.

The foregoing detailed description of the invention has been given for clearness of understanding only, and no unnecessary limitations are to be understood therefrom. The invention is not limited to the exact details herein shown and described, and will encompass obvious modifications which will occur to those of skill in the art in light of the appended claims.

What is claimed is:

1. A process for preparing block and/or graft copolymers wherein said process comprises:
   a. forming an intimate mixture of two or more polymers selected from the group consisting of polyamides, polyesters, acid homopolymers of alpha beta unsaturated carboxylic acids and acid copolymers of alpha, beta unsaturated carboxylic acids and alpha beta unsaturated olefins, and an effective amount of one or more phosphite compounds of the formula

and symmetrical and asymmetrical diphosphite derivatives thereof; wherein $R_1$ is alkyl, haloalkyl, or phenyl either unsubstituted or substituted with one or more substituents selected from the group consisting of alkyl, halogen, haloalkyl, nitro, cyano, and isocyanato, with $R_2$ and $R_3$ being the same or different and being a metal cation, ammonium cation, hydrogen or $R_1$; wherein at least one of said polymers includes one or more amino moieties and at least one of the remaining polymers includes one or more carboxylic acid moieties; and
   b. heating said mixture for a period of time between about 2 minute and about 30 minutes at a temperature at or above the melting point of said polymers to form said block and/or graft copolymer.

2. A process according to claim 1 wherein said mixture is a molten mixture.

3. A process according to claim 1 wherein said polymer is selected from the group consisting of polycaprolactam, polyhexamethylene adipamide, polyethylene terephthalate, ethylene/acrylic acid copolymer and ethylene/acrylic acid copolymer in which all or a portion of the acid residues are neutralized with metal cations.

4. A process according to claim 1 wherein $R_1$, $R_2$ and $R_3$ are the same.

5. A process according to claim 4 wherein $R_1$, $R_2$ and $R_3$ are selected from the group consisting of alkyl and haloalkyl each having from about 2 to about 6 carbon atoms, phenyl or phenyl substituted with chloro, alkyl having from 1 to about 6 carbon atoms and haloalkyl having from 1 to about 6 carbon atoms.

6. A process according to claim 5 wherein $R_1$, $R_2$ and $R_3$ are selected from the group consisting of tert-butyl, n-butyl, 2-chloroethyl, phenyl, 3,5-di-tert-butylphenyl, and 4-chlorophenyl.

7. A process according to claim 1 wherein the amount of said one or more phosphite compound is at least about 0.05 weight percent based on the total weight of the mixture.

8. A process according to claim 6 or 7 wherein said amount is from about 0.1 to about 10 weight percent.

9. A process according to claim 6 or 7 wherein said amount is from about 0.2 to about 2 weight percent.

10. A process in accordance with claim 1 wherein said copolymer contains polyamide and polyester segments.

11. A process in accordance with claim 10 wherein said polyamide segment is derived from polycaprolactam.

12. A process in accordance with claim 11 wherein said polyester segment is derived from polyethylene terephthalate.

13. A process in accordance with claim 1 wherein said copolymer is a copolymer containing segments derived from polyamides.

14. A process in accordance with claim 13 wherein said segments are derived from poly(hexamethylene adipamide) and polycaprolactam.

* * * * *